United States Patent [19]

Regis et al.

[11] Patent Number: 5,442,679
[45] Date of Patent: Aug. 15, 1995

[54] APPARATUS FOR USE IN ISOLATING THE CAUSE OF A DROPPED TELECOMMUNICATION CALL

[75] Inventors: Harry J. Regis, Jamaica, N.Y.; Avram R. Vener, Red Bank; Charles A. White, Whitehouse Station, both of N.J.

[73] Assignee: AT&T Corp., Murray Hill, N.J.

[21] Appl. No.: 239,077

[22] Filed: May 6, 1994

[51] Int. Cl.⁶ .................. H04M 1/24; H04M 3/22; H04M 15/00
[52] U.S. Cl. .................. 379/34; 379/1; 379/35; 379/112; 379/113; 379/133
[58] Field of Search .................. 379/1, 36, 35, 111, 379/112, 113, 133, 136, 137

[56] References Cited

U.S. PATENT DOCUMENTS

| | | | |
|---|---|---|---|
| 4,330,688 | 5/1982 | Tiribelli | 379/113 |
| 4,456,788 | 6/1984 | Kline | 379/137 |
| 4,815,120 | 3/1989 | Kosich | 379/35 |
| 5,291,547 | 3/1994 | Boatwright | 379/113 |
| 5,299,259 | 3/1994 | Otto | 379/113 |

OTHER PUBLICATIONS

AT&T Practice Standard, "Brush Recorder Mark 220," Section 100-131-120, Issue 1, May 1969, pp. 1-3 (Reprint Jul. 1994).
DATAQ Instruments, Inc., Special Supplement, Third Edition Catalog, pp. 1-4.
DATAQ Instruments, Inc., "The DI-100 CODAS Demonstration System User's Guide," AN-16, DI-100 Application Note, pp. 1-6.
Dranetz Technologies, Inc., "Operator's Manual, Model 626 Mainframe, vol. I," TM-10665OU, pp. 1-1-1-2.
Dranetz Technolgies, Inc., "Operator's Manual, 626-PA-6002A DC Monitor, vol. 2," TM-110385-IU, pp. 1-1-1-3.
Tektronix, "TestLab: A New Test Strategy for Physical Measurements.".

Primary Examiner—Stephen Chin
Assistant Examiner—Vijay Shankar

[57] ABSTRACT

A data acquisition apparatus, for use as a diagnostic tool in isolating the cause of chronic dropped telecommunication calls, monitors electrical signals associated with multiple telecommunication trunks. It recognizes each occurrence of a terminated call based upon loop current cessation of a duration greater than a predetermined time interval. Each occurrence of a terminated call, as well as electrical data indicative of which equipment terminated the call, is time-stamped and recorded. The apparatus also time-stamps and records data regarding additional electrical events based upon pre-determined ranges of current and voltage. It creates a chronological log of the recorded data. The apparatus interprets the recorded data and provides an easily intelligible message indicating which equipment terminated a particular call. The recorded data and the messages can then be conveniently analyzed by technicians or other personnel on a display screen to determine which equipment dropped a call and to identify significant trends regarding dropped calls. The apparatus functions in a manner that is transparent to a customer so that it does not interfere with the customer's usage of the equipment being monitored.

18 Claims, 8 Drawing Sheets

APPARATUS FOR USE IN ISOLATING THE CAUSE OF A DROPPED TELECOMMUNICATION CALL

FIELD OF THE INVENTION

The present invention relates generally to diagnostic tools for use in telecommunication systems. More specifically, it relates to an apparatus for use in isolating the cause of chronic dropped calls.

BACKGROUND OF THE INVENTION

Among the maintenance situations in a telecommunication system that are difficult to resolve is the condition of chronic dropped or cut-off calls at a customer's location. The difficulty arises from a limited ability to readily isolate the cause of the dropped calls as either the telecommunication network or customer premises equipment (CPE).

Some of the events which often take place during the process of analyzing and rectifying a chronic dropped call problem are described below. While the events described below may not all be inflicted upon any one customer, they are typical of the difficulties that may arise. Typically, a customer reports the problem of dropped calls to a service assistance center.

Upon a customer's first report, the service assistance center may avoid dispatching a technician until remotely-administered diagnostic tests have been completed without finding the fault. If a technician must be dispatched, there may be little he can do unless a dropped call actually takes place during his presence. If no dropped call occurs, the customer may insist that the technician attempt some repair action without assurance that the fault is being corrected. Sophisticated monitoring equipment can be used to record all events for later analysis, but technicians typically do not have ready access to this equipment or the skill to use it.

If the technician's action does not resolve the problem, a field engineer may be dispatched with chart recording equipment to monitor signals on suspicious central office telecommunication lines or trunks. Devices which gather voltage data from multiple channels are known in the art. These devices record all monitored electrical signals for later analysis. Some of these devices also store and display the data on a personal computer screen. Such equipment can be used by a field engineer to monitor signals on telecommunication lines and trunks. Much of the field engineer's time, however, may be spent waiting for an instance of a dropped call to occur. Additionally, the customer may be billed by either the local telephone company or the customer equipment service provider if no problem is found in the respective system.

The events described above, among others, suggest the need for a device which quickly and positively isolates the cause of dropped calls to either the telephone network or customer premises equipment (CPE).

SUMMARY OF THE INVENTION

The present invention discloses a data acquisition apparatus for use in isolating the cause of dropped telecommunication calls. The apparatus comprises:
a detector circuit having:
 (a) a pair of leads; and
 (b) a plurality of outputs which, when said pair of leads is connected electrically with a telecommunication trunk, provides a first set of output signals which correspond to current levels on said telecommunication trunk and a second set of output signals which correspond to voltage levels on said telecommunication trunk;
a comparator circuit connected to said detector circuit so as to receive said first set of output signals and said second set of output signals, where said comparator circuit is capable of comparing said first set of output signals to pre-selected bands of current and comparing said second set of output signals to pre-selected bands of voltage; and
a processing unit electrically connected to said comparator circuit and programmed to perform the following functions:
 (a) determine within which of said pre-selected bands each of said output signals falls;
 (b) determine the occurrence of a change in the preselected band within which an output signal on a particular one of said plurality of outputs falls, where said change occurs relative to an immediately previous scan of said particular output;
 (c) record the time at which said change occurred;
 (d) provide at least one message indicating that said change occurred and indicating the present preselected band within which the particular output signal falls;
 (e) record the time at which a telecommunication call on said telecommunication trunk is terminated; and
 (f) provide at least one message including electrical data indicative of which equipment terminated said telecommunication call.

Other features and advantages of the present invention will be readily apparent by reference to the following detailed description and accompanying drawings.

DETAILED DESCRIPTION OF THE INVENTION

Figure 1:
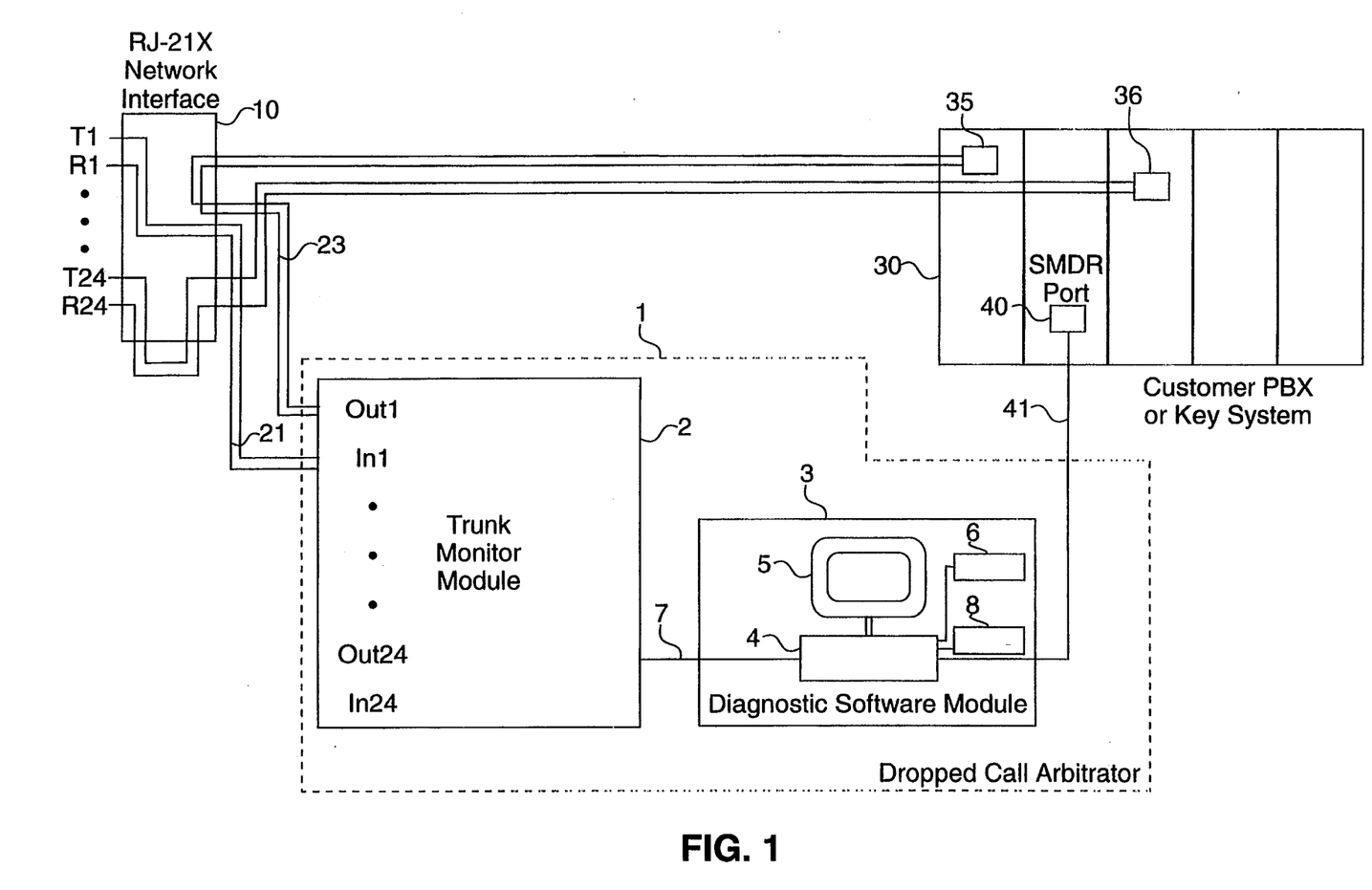
FIG. 1 is a functional block diagram showing an exemplary application of the apparatus of the present invention.

FIG. 1 is a functional block diagram showing an exemplary application of the apparatus of the present invention, shown in FIG. 1 as a Dropped Call Arbitrator (DCA) 1. Similarly numbered items refer to the same feature throughout. The DCA shown in FIG. 1 comprises two subsystems: a Trunk Monitoring Module (TMM) 2 and a Diagnostic Software Module (DSM) 3.

The DSM 3 comprises a personal computer 4, such as a DOS Notebook personal computer, running diagnostic software. The personal computer 4 is connected to a keyboard 6, and a display unit comprising a display monitor 5 and a printer 8. The TMM 2 and the DSM 3 are more fully described below.

The DCA 1 is installed at a customer site and connected to all central office trunks or facilities potentially involved in the customer's complaint of chronic dropped calls. The facilities that the DCA 1, as shown in FIG. 1, can monitor include any combination of up to twenty-four analog loop start, ground start, and direct in-dial facilities. It is to be understood, however, that a DCA according to the present invention may be configured to monitor more or fewer than twenty-four facilities without departing from the scope and spirit of the present invention. In FIG. 1, only two tip and ring lead pairs, T1/R1 and T24/R24, are shown in detail. It should be understood that as few as one and as many as twenty-four trunks with corresponding pairs of tip and ring leads may be monitored by the DCA 1 shown in FIG. 1. During normal operation when the DCA 1 is not installed, the pair of leads T1/R1 is connected through an RJ-21X Network Interface 10 to a trunk port 35 residing on a customer PBX or key system 30. Similarly, during normal operation, the pair of leads T24/R24 is connected via the Network Interface 10 to a trunk port 36 on the customer PBX 30 as shown in FIG. 1. When the DCA 1 is in place, the pair of leads of a trunk that is to be monitored, for example, the pair of leads T1/R1, is diverted through a series connection with the TMM 2 by removing bridging clips from the Network Interface 10 and replacing them with pairs of leads 21 and 23 that are connected to the TMM 2. The TMM 2 is connected to the trunks or facilities to be monitored in such a way that the operation of the TMM 2 is transparent to the customer and does not interfere with his usage of the equipment being monitored.

Although other configurations are readily apparent, a TMM according to the present invention is preferably configured as a hardware device that may be housed in a single metal or plastic cabinet. The TMM 2 has twenty-four pairs of input and output ports IN1/OUT1 through IN24/OUT24, although FIG. 1 shows only two such pairs, IN1/OUT1 and IN24/OUT24, for clarity. When the DCA 1 is installed, the pair of leads 21 is connected to the port IN1 on the TMM 2, and the pair of leads 23 is connected to the port OUT1 on the TMM 2 such that the tip and ring designations remain consistent.

Figure 2:
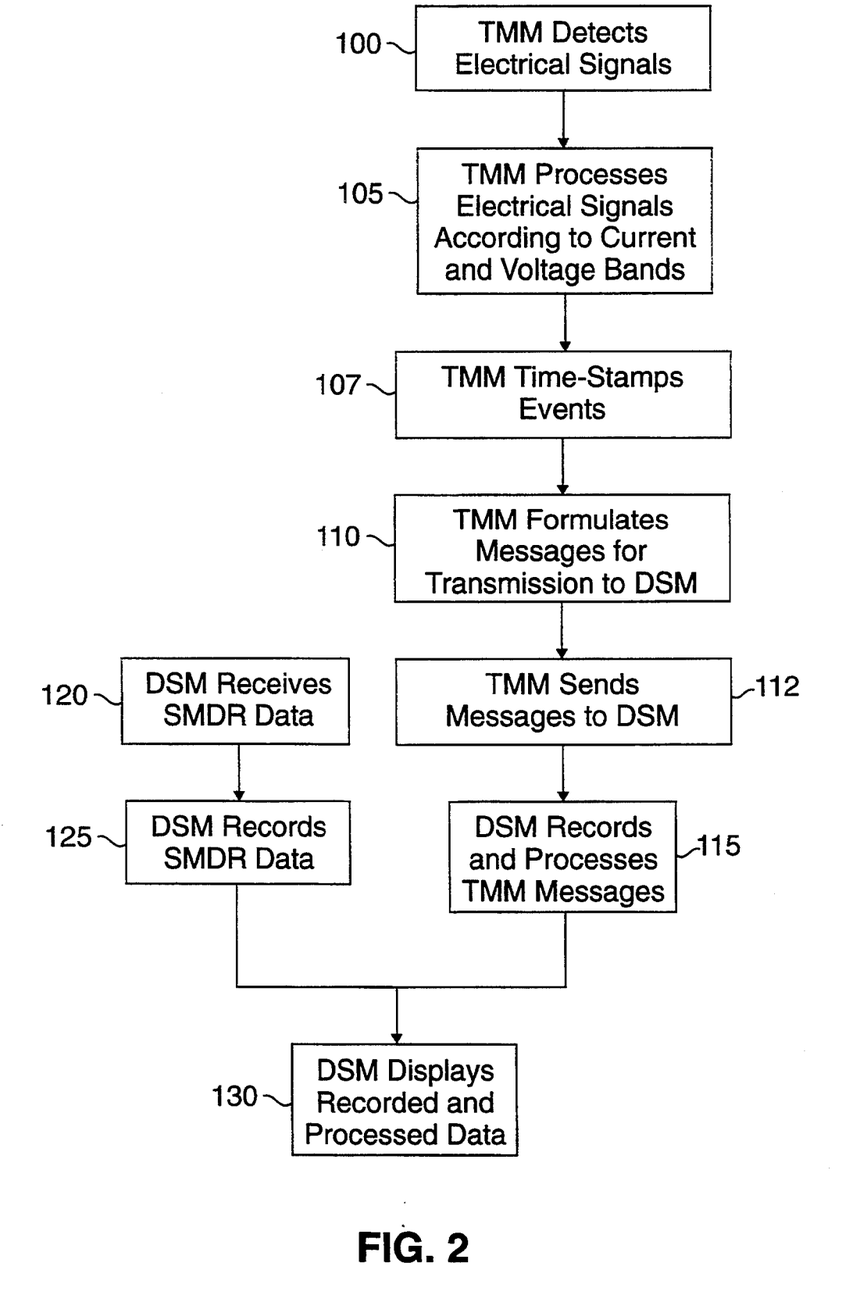
FIG. 2 is a flow chart showing the steps and functions performed by the apparatus of the present invention.

FIG. 2 is a flow chart showing the steps and functions performed by the DCA 1. In step 100, the TMM 2 monitors and detects electrical signals associated with each trunk to which the TMM 2 is connected, such as levels of loop current as well as levels of tip-to-ground voltage (tip-ground voltage), ring-to-ground voltage (ring-ground voltage), and tip-to-ring voltage (tip-ring voltage). Any trunk or line whose electrical signals are monitored or detected by the apparatus of the present invention may be referred to generally as a monitored telecommunication trunk. The electrical signals are processed in the TMM according to pre-selected bands or ranges of current and voltage as shown in step 105. The time at which specified electrical events, such as significant values of or changes in the current and voltage levels, occur is recorded (time-stamped) by the TMM 2, as shown in step 107 and as explained further below. In general, a particular value or change in the value of an electrical signal is time-stamped as an event because of its ability to assist technicians or other personnel in locating and isolating the cause of chronic dropped calls. The most significant events which the DCA 1 time-stamps include the cessation of loop current flow and the voltage levels at the time of disconnect. Next, in step 110, the TMM 2 formulates messages regarding the time-stamped events for transmission to the DSM 3. In step 112, these messages are then sent to the DSM 3 via link 7 as indicated. The link 7 may be, for example, a standard RS-232 serial link. The DSM 3 records and processes these messages to provide a log of the current and voltage activity in a readable format as shown in step 115.

In addition to receiving and recording data from the TMM 2, the DSM 3 receives and records Station Message Detail Recording (SMDR) data via link 41 from an SMDR port 40 on the PBX or key system 30 as shown in steps 120 and 125, respectively. Finally, in step 130, the DSM 3 displays on display 5 the recorded and processed data in response to a user's request.

Figure 3:
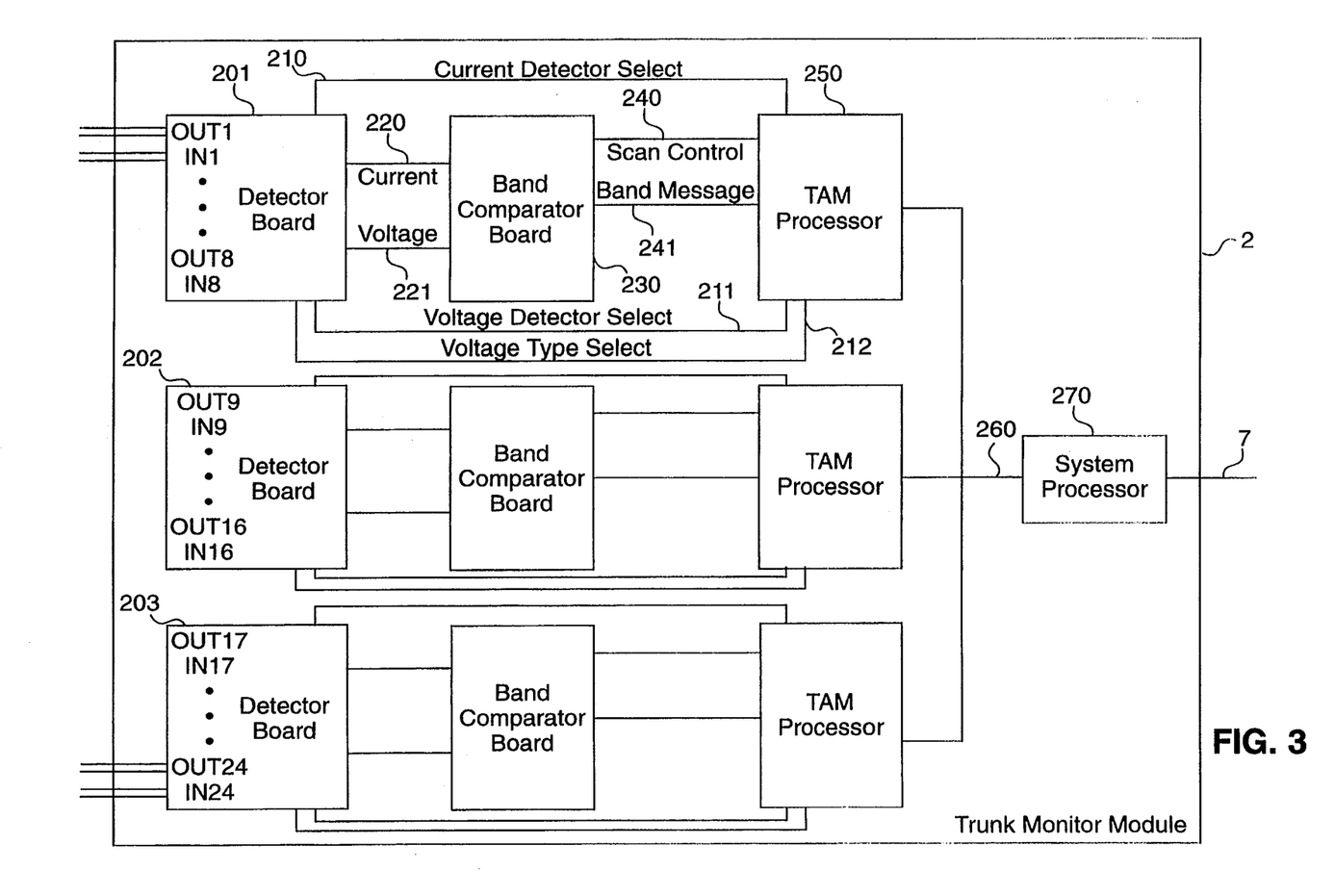
FIG. 3 is a functional block diagram showing the trunk monitor module (TMM) of FIG. 1 in greater detail.
Figure 4:
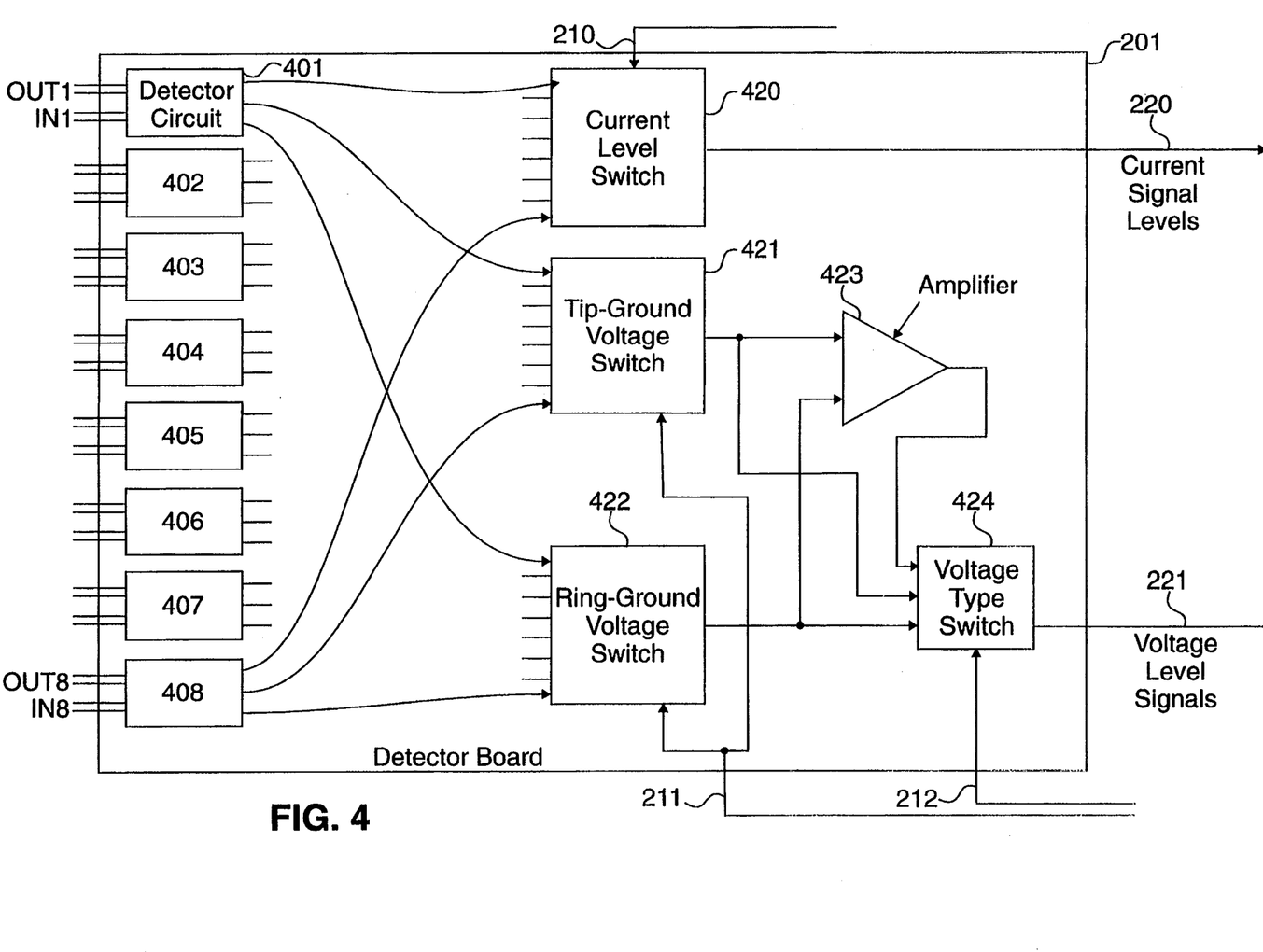
FIG. 4 is a functional block diagram showing a detector board for use in the TMM.

FIG. 3 is a functional block diagram showing the TMM 2 in greater detail. The TMM 2 shown in FIG. 3 includes three detector boards 201, 202 and 203, each of which can detect voltage and current levels for up to eight trunks or facilities. Each detector board, such as the detector board 201, includes eight detector circuits 401–408 as shown in FIG. 4 One detector circuit is connected to the leads of each trunk that is to be monitored.

Figure 5:
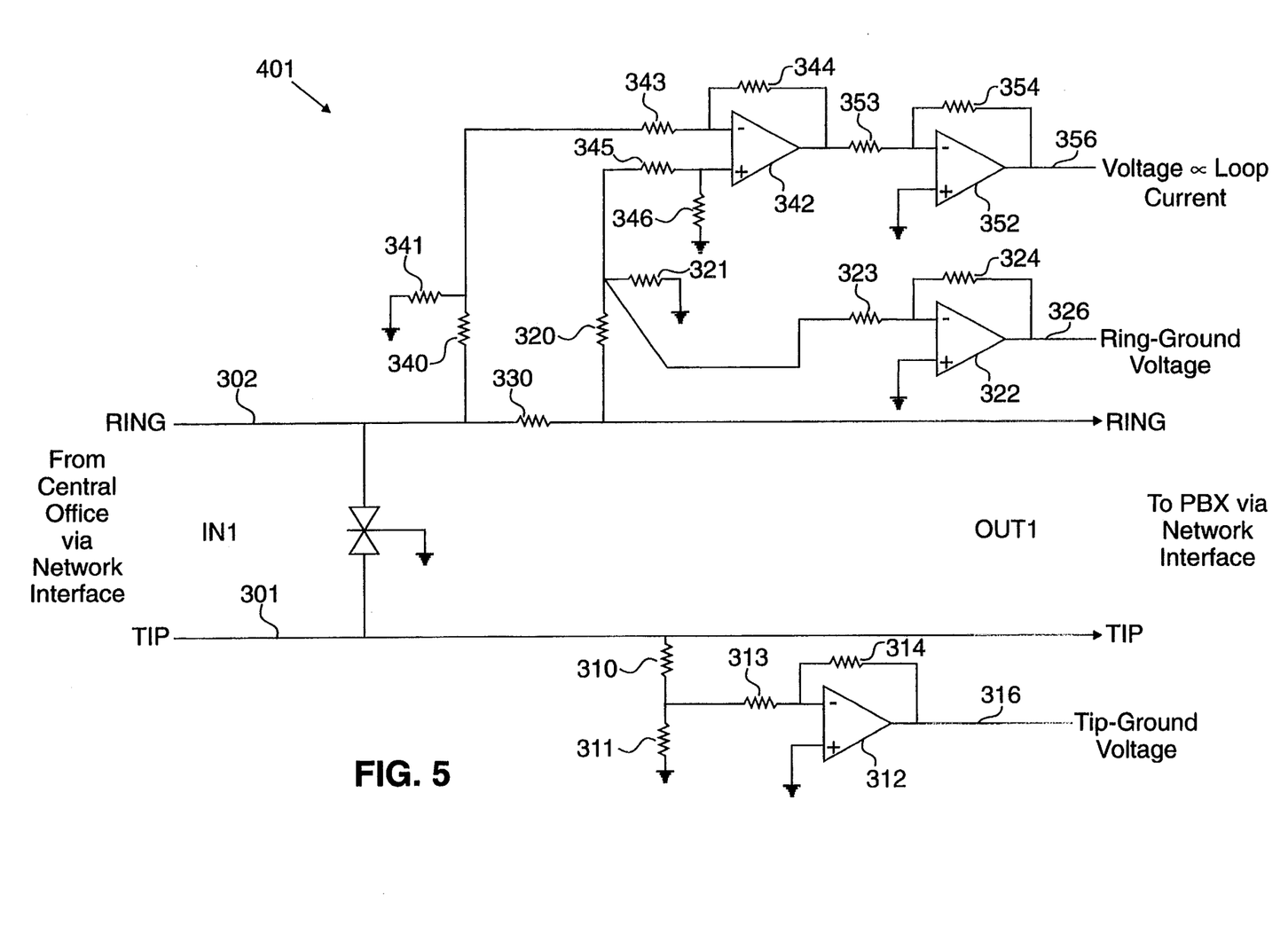
FIG. 5 is a schematic diagram of an exemplary detector circuit for use in the present invention.

An exemplary detector circuit 401, also suitable for use as any one of the detector circuits 402–408, is shown in FIG. 5. The detector circuit 401 includes tip and ring leads 301 and 302. The leads 301 and 302 are electrically connected at one end to the pair of leads 21 via port IN1. At the other end, the leads 301 and 302 are electrically connected to the pair of leads 23 via port OUT1.

A tip-ground voltage detector is connected to the tip lead 301. A voltage divider, including resistors 310 and 311, prescales the voltage levels by one tenth in a manner well-known in the art. For example, the resistors 310 and 311 may be 330 k-ohm and 33 k-ohm resistors, respectively. The voltage level between the two resistors 310 and 311 is then detected as the output of an operational inverting amplifier 312 connected in a manner well-known in the art as shown in FIG. 5. For example, the resistors 313 and 314 may be 100 k-ohm and 120 k-ohm resistors, respectively. The output 316 of the amplifier 312 is proportional to the tip-ground voltage for the particular trunk that is monitored by the detector circuit 401. A similar ring-ground voltage detector is connected to the ring lead 302 as shown in FIG. 5. The values of resistors 320, 321, 323 and 324 may be the same as the values of the corresponding resistors 310, 311, 313 and 314, respectively. The output 326 of an operational inverting amplifier 322 is proportional to the ring-ground voltage.

The loop current of the monitored trunk is detected indirectly in the detector circuit 300 by detecting a voltage that is approximately linearly proportional to the loop current level. This result is accomplished by placing a precision resistor 330 in series with the ring lead 302 as shown in FIG. 5. The resistor 330 should have a value of approximately 50 ohms or less. In any case, the value of the resistor 330 is sufficiently low so that the operation of the TMM 2 remains transparent to the customer and does not interfere with his usage of the equipment being monitored. The voltage levels at either end of the resistor 330 are pre-scaled by using voltage dividers comprising the resistors 320 and 321, and resistors 340 and 341, respectively. The resistors 340 and 341 have the same values as the resistors 320 and 321. The pre-scaled voltage levels are used as the inputs for a differential amplifier 342 with high impedance as shown in FIG. 5. For this purpose, resistors 343, 344, 345 and 346 may each have, for example, the value of 100 k-ohms. Finally, the output from amplifier 342 is used as an input to another amplifier 352 as shown in FIG. 5. Resistors 353 and 354 may also have the same value as the resistors 313 and 314, respectively. The output 356 of the amplifier 352 is proportional to the value of the loop current in the monitored trunk. Each detector circuit 401–408, therefore, has a plurality of outputs which provide a first set of output signals that correspond to current levels on a monitored trunk and a second set of output signals that correspond to voltage levels on the monitored trunk.

With reference again to FIG. 3 and FIG. 4, the eight voltage output signals that correspond to the loop current levels, one from each of the detector circuits 401–408 on the detector board 201, are connected to an analog current-level signal switch 420. The switch 420 may be implemented, for example, as a multiplexer. Although connections are shown only for the detector circuits 401 and 408, it is to be understood that similar connections are made for the detector circuits 402–407. The switch 420 is connected, via current-level-detector select lines 210, to a trunk access module (TAM) processor 250, where the select lines 210 include three lines for carrying a three-bit binary-code message. The TAM processor 250 may be, for example, a commercially available Z80 micro-processor which scans the current and voltage levels of each monitored trunk as explained further below. The TAM processor 250 sends a current-level-detector select message via the current detector select lines 210 to the switch 420. The current-level-detector select message is a three-bit binary-code message that selects the particular trunk to be scanned. The switch 420 then allows the voltage signal, which corresponds to the loop current on the particular trunk, to be sent to a band comparator board 230 via a current-level signal line 220.

In a similar manner, the eight tip-ground voltage outputs, one from each of the detector circuits 401–408 on the detector board 201, are connected to an analog tip-ground voltage signal switch 421. Also, the eight ring-ground voltage outputs, one from each of the detector circuits 401–408 on the detector board 201, are connected to an analog ring-ground voltage signal switch 422. Although connections are shown only for the detector circuits 401 and 408, it is to be understood that similar connections are made for the detector circuits 402–407. The TAM processor 250 sends a voltage-detector select message to the tip-ground voltage signal switch 421 and the ring-ground voltage signal switch 422 via voltage-detector select lines 211, where the select lines 211 include three lines for carrying a three-bit binary-code message. The voltage-detector select message also is a three-bit binary-code message that selects the particular trunk that is to be scanned. The switches 421 and 422 then allow the tip-ground voltage and ring-ground voltage signals on the selected trunk to be sent to a voltage-type switch 424. The tip-ground voltage signal switch 421, the ring-ground voltage signal switch 422, and the voltage-type switch 424 may be implemented, for example, as multiplexers. The tip-ground voltage and ring-ground voltage signals also serve as inputs to another operational inverting amplifier 423. The output of the amplifier 423 is the tip-ring voltage signal and it is also sent to the voltage-type switch 424. The TAM processor 250 then sends a voltage-type select message to the voltage-type switch 424. This message is a three-bit binary-code message that selects one of the three voltage types, tip-ground voltage, ring-ground voltage or tip-ring voltage. The switch 424 then allows the selected voltage signal to be sent to the band-comparator board 230 via a voltage-level line 221. The detector circuit 401 described above and shown in FIG. 5 is exemplary only. In some applications, it may be desirable to include, for example, circuitry that will detect the presence or absence of a ringing voltage on a monitored trunk. Circuits for detecting ringing voltage are well-known in the art, and are not further described herein.

Upon receiving current-level and voltage-level signals from a detector board, a band comparator board, such as the band comparator board 230, compares those signals to certain preselected bands of current and voltage. The current bands are actually pre-selected ranges of voltage that correspond to ranges of loop current. For example, the following current bands may be used: 0–15 milliamps (mA), 15–20 mA, 20–21 mA, 21–22 mA, 22–23 mA, 23–25 mA, and 25–80 mA. These current bands are, however, exemplary only, and additional or different current bands may be used. For each current band, a comparator is configured such that the output of the comparator is indicative of whether the detected voltage corresponding to the loop current is higher than the highest value within that band. A second set of comparators is used for the negative current bands corresponding to the situation in which the loop current flows in the reverse direction. A voltage divider may be used in order to obtain the reference voltages corresponding to each band. The detected voltage that is proportional to the loop current serves as the positive input for each of the positive-band comparators and as the negative input for each of the negative-band comparators. The output of each comparator is a logical zero or one, where a logical one indicates that the detected level is higher than the highest value within the band to which that comparator corresponds.

The band comparator board 230 also includes comparators that determine within which voltage band a tip-ground voltage or ring-ground voltage signal falls. By way of example, the pre-selected voltage bands may cover the following voltage ranges: in ten-volt bands from zero volts to +110 volts. A comparator is configured for each voltage band such that the output of the comparator is indicative of whether the voltage signal is higher than the highest value within that band. A second set of comparators is used for the corresponding negative voltage bands. As before, the output of each comparator is a logical zero or one, where a logical one indicates that the detected voltage is higher than the highest value within that band.

Figure 6:
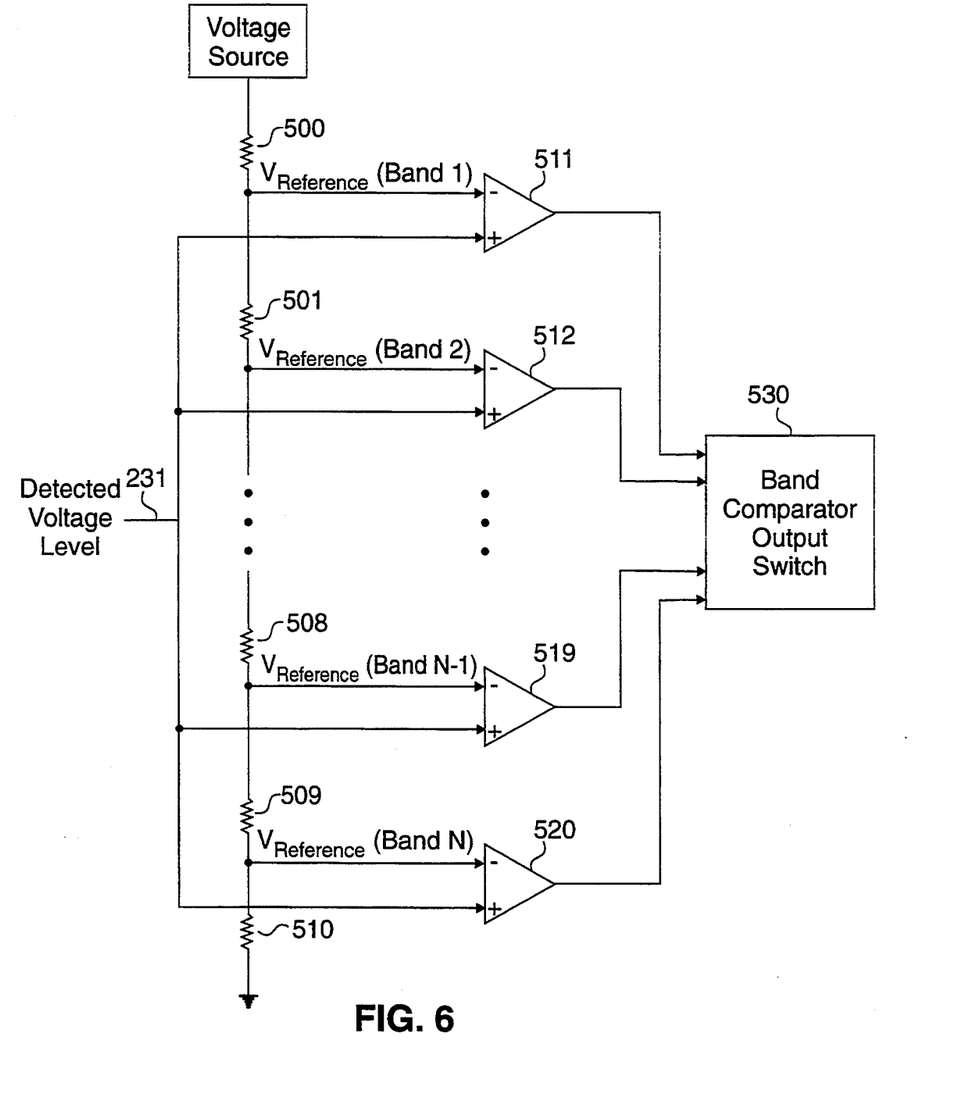
FIG. 6 shows an exemplary circuit for determining within which voltage band a detected voltage signal falls.

FIG. 6 shows an exemplary implementation of N positive voltage ranges or bands according to the scheme explained above. The resistors 500, 501, 508, 509 and 510 are chosen such that the reference voltages that are connected to the negative inputs of comparators 511, 512 519 and 520 equal the highest value within each positive voltage range, respectively, starting with the highest voltage range. The comparators 511, 512, 519 and 520 may be commercially available Motorola LM339 comparators configured in a non-inverting mode with hysteresis. Although only four comparators 511, 512, 519 and 520 are shown in FIG. 6, it is to be understood that there is one comparator configured with an appropriate reference voltage corresponding to each positive voltage range. The detected voltage that was selected by the TAM processor 250 is connected via the voltage line 221 to the positive input of each comparator as shown in FIG. 6. The outputs of the comparators 511, 512, 519 and 520 are connected to a band comparator output switch 530, which may also be a multiplexer. Similar implementations may be used for the negative voltage bands as well as the current bands. Additionally, the negative voltage and current bands may be implemented in a similar manner by using commercially available Motorola LM339 comparators configured in an inverting mode with hysteresis.

Once the band comparator board 230 has received the current and voltage level signals, the trunk access module processor 250 sends a scan-control message via a scan-control message-line 240. The scan-control message selects, in sequence, the output of each comparator corresponding to a positive current band. The outputs are selected starting witch the highest current band. As the output of each comparator is selected, it is sent via a band message line 241 to the TAM processor 250. The scanning process continues until the TAM processor 250 recognizes a logical one. If no logical one is recognized during the scan of the positive bands, then the outputs of the comparators corresponding to the negative current bands are scanned. The TAM 250 also scans the negative bands in sequence beginning with the band corresponding to the highest absolute value of current. The first scanned comparator output that is a logical one is indicative of which band the detected signal falls within. When the TAM 250 recognizes a logical one, it then sends two eight-bit binary-code messages to a system processor or controller 270 via a queue 260 as explained further below. The TAM 250 and the system processor 270 may be considered a processing unit. If the TAM processor 250 does not detect a logical one after scanning both the positive and negative current bands, then the loop current value falls either within the lowest positive current band, for example, 0–15 mA, or the negative band with the lowest absolute values, for example, from −15 to 0 mA. When the loop current falls within either of these two current bands, there is, in effect, no loop current flow. In this case, the TAM processor 250 also sends two eight-bit binary-code messages to the system processor 270. The TAM processor 250 also scans the comparators corresponding to the voltage-level bands by scanning the comparators in sequence in the same manner as described for scanning the current bands. The TAM processor 250 then sends two eight-bit binary-code messages to the system processor 270 as explained below.

The TAM processor 250 also scans the voltage bands when the other voltage types are selected. The TAM processor 250 sends a voltage-type select message via line 212 to the detector board 201 in order to select another type of detected voltage signal for transmission to the band comparator board 230. For example, if the band comparator board 230 previously had received the tip-ground voltage signal from the detector circuit 401, it would now receive the ring-ground voltage signal from the detector circuit 401. Again, the TAM processor 250 would scan the voltage band comparators on the band comparator board 230 until it recognized a logical one or until it had scanned all the band comparator outputs and detected only logical zeros. The TAM processor 250 would then send two eight-bit binary-code messages to the system processor 270. The same procedure is used to detect the voltage band within which the tip-ring voltage falls. Once the TAM processor 250 has selected a particular trunk and scanned the current-level and voltage-level signals on that trunk, it proceeds to select the next trunk to be monitored and to scan the electrical signals on the next monitored trunk. Each trunk may be selected and its signals scanned periodically at a rate of approximately once every ten milliseconds. The output signals from the detector circuits are thereby selectively received by the comparator board.

Figure 7:
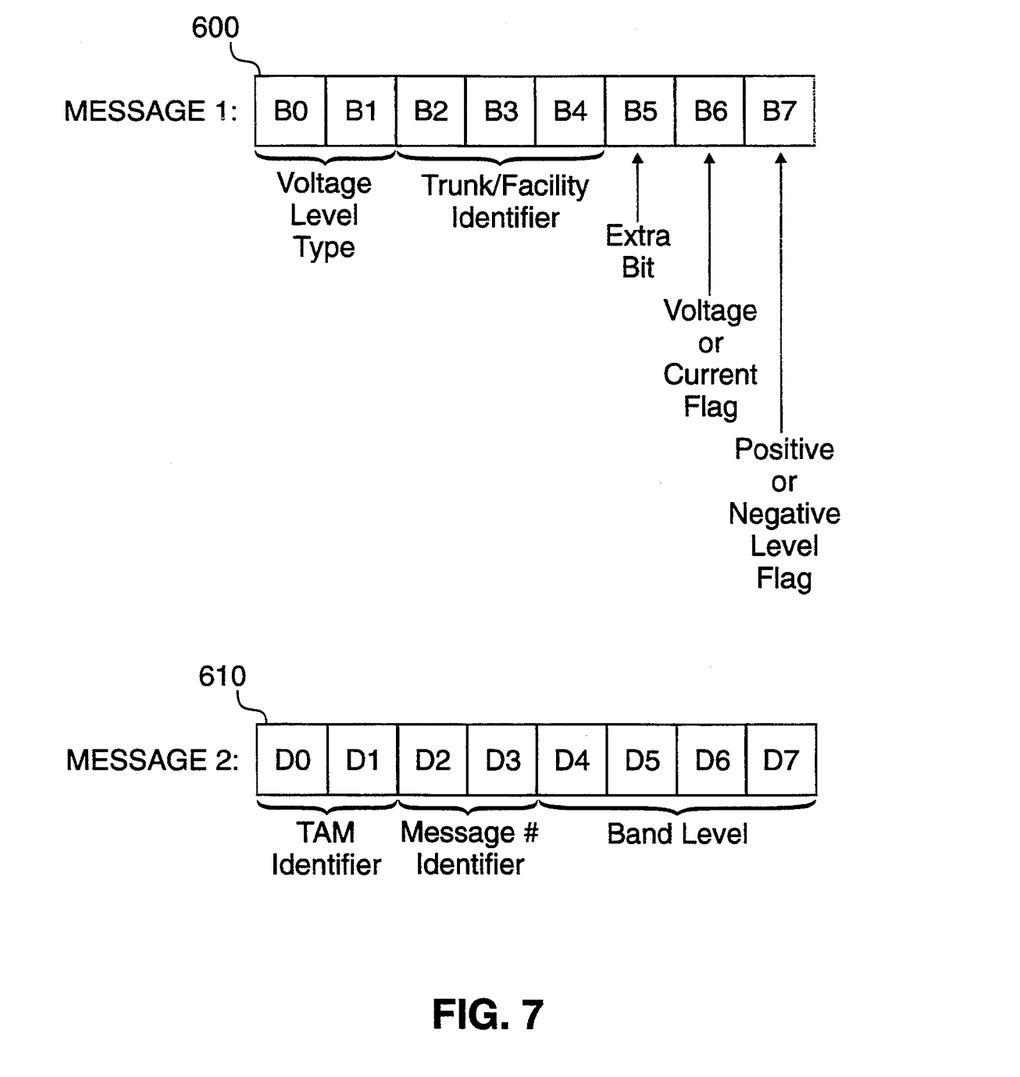
FIG. 7 shows the format of messages sent by a trunk access module (TAM) controller to a system controller.

FIG. 7 shows the format of the two eight-bit binary-code messages 600 and 610 that the TAM processor 250 sends to the system processor 270. As shown in FIG. 7, three bits, B2, B3, and B4 in the first message 600 identify the trunk or facility that is currently being scanned. Three bits are needed because each TAM processor scans up to eight trunks. Another bit B6 is a flag indicating whether a voltage or current band message is being sent. Two bits B0 and B1 indicate the voltage-level type, for example, whether the signal represents the tip-ground voltage, the ring-ground voltage, or the tip-ring voltage. Another bit B7 indicates whether band-level information that will be sent in the second message 610 pertains to a positive or negative band as discussed above. Finally, the first message 600 contains an extra bit B5 which may be used, for example, to indicate whether or not ringing occurred on the monitored trunk when the TMM 2 includes circuitry to detect the presence or absence of ringing.

As shown in FIG. 3, each detector board is connected to a band comparator board and a trunk access module (TAM) processor. Each TAM processor sends messages to the system processor 270, which must recognize which TAM processor sent a particular message. Each TAM processor, therefore, has its own unique identifier which it sends to the system processor 270 whenever a message is sent from that TAM processor. The second message 610, shown in FIG. 7, uses two bits D0 and D1 to identify the particular TAM processor that is sending the messages. Two bits D2 and D3 are also used to identify this message as the second message of two eight-bit messages. One bit would suffice for this purpose, so that one of the two bits D2 or D3 may be used for transmitting other information if desired. Finally, four bits D4 through D7 are used to indicate the particular band within which the voltage or current signal fell or to indicate that the current or voltage level is considered to be zero. It will be recognized that other addressing schemes could readily be adopted and would be suitable for use with the present invention.

As it receives signals from the TAM processors, the system processor 270, which may also be a Z80 microprocessor, utilizes a priority interrupt scheme to determine which messages it will receive next. Whenever the system processor 270 is receiving a message from a particular TAM processor, such as the TAM processor 250, that TAM processor interrupts its scanning of electrical signals until it receives an acknowledgement from the system processor 270 that the information transmitted by the TAM processor was received.

The system processor 270 includes a control block for each trunk that the TMM 2 is scanning. For each telecommunication call involving one of the monitored facilities, the system processor 270 determines whether the call has been terminated or disconnected based upon a cessation of loop current flow of duration greater than a pre-determined programmable interval. The programmable interval may be selected, for example, from among several intervals, such as intervals of 350, 500 or 750 milliseconds. Other intervals are, of course, possible. Furthermore, selection of the interval may vary by facility. These selections are made by authorized personnel during set-up of the dropped call arbitrator 1 at the customer's site. The occurrence of a terminated call based upon cessation of loop current is the most significant event that the DCA 1 records.

The voltage levels at the time of disconnect or call termination, including the tip-ring voltage, the tip-ground voltage, and the ring-ground voltage, are particularly important because they serve as the primary indicator of which equipment caused the call to be terminated. On loop start and ground start lines or trunks, zero tip-ring voltage indicates termination by the central office, and an open circuit voltage greater than 40 V indicates termination by the customer premises equipment (CPE). The reverse applies to direct in-dial trunks. When the system controller 270 detects cessation of loop current on a particular trunk, it time-stamps both the occurrence of cessation of loop current as well as the voltage bands within which each of the different voltage types falls at the time of disconnect or call termination. The system processor 270 then formulates a message for transmission to the DSM 3 as further explained below.

While the embodiment described above is the preferred embodiment for providing data indicative of which equipment terminated a call to the DSM 3, certain applications may require a modification of the detector circuit described above. For example, when the PBX 30 detects a loss of current during a call, it typically reapplies a 48 V tip battery. If, however, the voltage from the tip battery is applied slowly, and the call involved a ground start trunk, then the tip-ring voltage at the time of loop current cessation may not be indicative of which equipment terminated the call. In such a situation, it is desirable to include additional circuitry in the detector circuit 401 as illustrated in FIG. 5A.

Figure 5A:
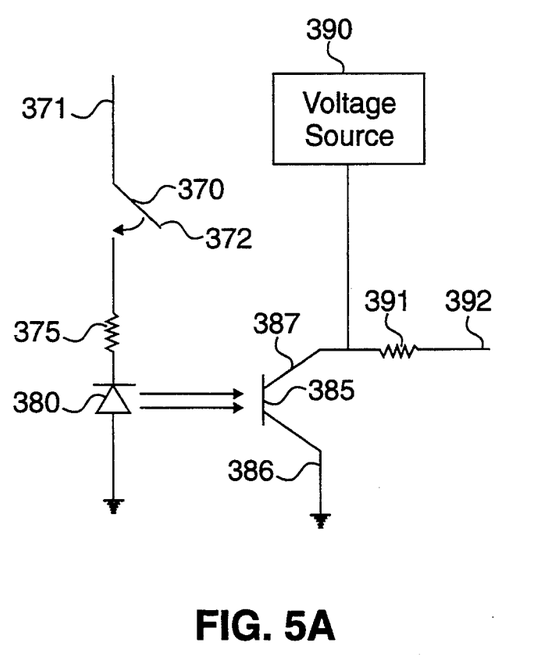
FIG. 5A shows additional circuitry for the detector circuit of FIG. 5.

With reference to FIG. 5A, the additional circuitry includes an optical oscillator, consisting of a diode 380 and a transistor 385 having an emitter 387 and a collector 386. A resistor 375 having a value, for example, of 15 k-ohm, is connected in series with the diode 380. One end 371 of a switch 370, which has opened and closed positions, is connected to the tip lead 301. When the switch 370 is in the closed position, the other end 372 of the switch 370 is connected in series with the resistor 375. The collector 386 of the transistor 385 is connected to ground, and the emitter 387 is connected to a voltage source 390.

A voltage may be measured at an output 392 connected to the emitter 387 via a resistor 391. When the switch 370 is in the closed position, the voltage, measured at the output 392 at the time when loop current cessation occurs, serves as an indication of which equipment terminated the call. For example, if the PBX 30 terminates the call first, then there will be no current flowing through the resistor 375, and the voltage at the output 392 will be a logical high signal. On the other hand, if the central office equipment terminates the call first, then a small current flows through the resistor 375, and a logical low signal will appear at the output 392.

When the system processor 270 determines that loop current cessation has occurred on the trunk connected to the detector circuit 401 as explained above, the system controller 270 sends a signal that closes the switch 370. The voltage at the output 392 is then sent to the system controller 270 which time-stamps the value received and which formulates a message for transmission to the DSM 3. As explained above, the high or low value of this output voltage serves as an indication of which equipment terminated the call.

It should be noted that the TMM 2 does not send messages and data regarding all detected or scanned electrical signals to the DSM 3. Rather, the TMM 2 only transmits messages and data regarding pre-selected electrical signals to the DSM 3. The preselected electrical signals are determined by the programming instructions incorporated into the system processor 270, the specific electrical signals monitored, and the preselected bands of current or voltage. As noted earlier, some of the programming instructions, such as the time interval which determines when loop current cessation is considered to indicate termination of a call, may be made during installation and set-up of the DCA 1 at the customer site. As a result, only the messages and data pertaining to the pre-selected electrical signals are received, recorded and processed by the DSM 3.

The system controller 270 is also programmed to formulate and transmit messages and data regarding other pre-selected electrical signals as well. For example, when the system controller 270 receives new data pertaining to a particular trunk, it compares the current and voltage band data to the current and voltage band data received during the immediately previous scan of that trunk. When a change from one current or voltage level band to another occurs for a given trunk or facility, an event has occurred. The system controller 225 time-stamps the new information and formulates a message for transmission to the DSM 3.

The TMM 2 also can be programmed to detect and time-stamp additional electrical signals or events of interest. These signals and measurements can further assist technicians or other personnel to locate precisely the cause of chronic dropped calls because the value of certain electrical signals obey a trunk protocol when the facility is functioning properly. For example, the system processor 270 can be programmed to time-stamp loop current interruptions equal to or less than the programmable interval. Also, loop current measurements that fall below a predetermined minimum value or rise above a maximum value may also be time-stamped and sent as messages to the DSM 3 indicating which trunk was involved and indicating that the value of the current fell below or rose above the specified threshold values. Finally, the system processor 270 can be programmed to time-stamp a signal indicating whether ringing has or has not occurred based upon a ringing voltage when such circuitry, which is well-known in the art, is included in the TMM 2. It should be understood that these additional electrical signals which the TMM 2 can be programmed to detect, time-stamp, and transmit to the DSM 3 are exemplary and are not intended to limit the scope of the invention.

In order to formulate a message for transmission to the DSM 3, the system controller 270 translates the time-stamped data to ASCII code sets using a look-up table according to well-known methods. The time-stamped message is then sent to the DSM 3 via the link 7.

The DSM 3 provides three basic functions which may be performed using DOS PC software designed for these purposes: 1. performing administrative functions, 2. receiving, recording and processing data from the TMM 2, and 3. reporting and displaying the data. When performing one of the three basic functions, the DSM 3 is in one of three corresponding modes respectively: an administration mode, a data logging mode, or a data viewing mode. Similarly, for each mode of operation, the monitor 5 provides a corresponding display.

The display corresponding to the data logging mode is the default display when the DSM 3 is first started. The monitor 5 displays the current trunk or port identification numbers and any associated labels. It also provides a command prompt for invoking a main menu which allows a user to enter one of the other modes or to exit the DSM 3 by selecting an appropriate option. The user may move a highlighted option bar either by entering on the keyboard 6 the first letter of the menu option or by using arrow keys on the keyboard 6. Pressing the return key on the keyboard 6 will then select the highlighted option.

During the data logging mode, the DSM 3 receives electrical signal messages in the form of ASCII code from the TMM 2. In the logging mode, the DSM 3 performs no processing other than logging data to a disk file. In the display mode, the DSM 3 processes, translates and interprets the ASCII code messages to record a chronological log of the current and voltage activity in a format that is convenient for a user to read. Most importantly, the DSM 3 is programmed to interpret the data for later display so that an easily intelligible message provides an indication as to when loop current cessation occurred and an indication as to which equipment terminated the call. The easily intelligible message conveys to a user an indication of which equipment terminated a call at a particular time without the user having to interpret the electrical data himself. The DSM 3 also translates and interprets the data regarding changes in the band within which the monitored signals fall so as to indicate when the change occurred and within which band each recorded electrical signal falls. In addition, the DSM 3 records SMDR data during the data logging mode of operation.

During the administration mode, the monitor 5 displays a data input screen permitting the user to select options that allow the user to label the trunk ports on the TMM 2, to specify the trunk type, and to choose a disconnect time interval for each trunk. On the basis of the selected disconnect time interval, the TMM 3 will determine when a call involving that trunk has been terminated as explained above. Another option in the administration mode is a time and-date synchronization option by which the DSM 3 sends a message to the TMM 2 that synchronizes the time and date of the TMM 2 with that of the DSM 3. This message is sent automatically when the DSM 3 is first started. A further option in the administration mode permits the user to change the name of either an SMDR or TMM data file.

When the data viewing mode is selected, the monitor 5 displays two windows containing the text of the TMM and SMDR data logs. In one window, the monitor 5 displays one message line for each electrical event received by the DSM 3 from the TMM 2 including the following information: month, day, hour, minute, second, hundredths of a second, trunk number, trunk label, and event data. The event data includes the data corresponding to the electrical event that occurred at the specified time. It includes the band within which the monitored current or voltage level fell when the event occurred. The event data also includes messages interpreting some of the electrical data so that a user need not interpret the electrical data. For example, if the electrical event indicates that loop current cessation occurred, a message is displayed indicating that fact. Similarly, on a message line indicating the voltage levels at the time of loop current cessation, a message is displayed indicating which equipment terminated the call. The messages are based upon the DSM's interpretation of the electrical data and messages that it receives from the TMM 2. The message lines are displayed in chronological order on the monitor 5, and the user can scroll forward or backward through the messages by pressing appropriate keys on the keyboard 6.

In the second window, the monitor 5 displays the SMDR data in the format in which the data is received from the SMDR port 40 on the PBX or key system 30. The user can restrict the lines of data which are displayed in either window by entering restriction patterns that limit the displayed data to a particular range of time, to particular trunks, or to particular types of events. Other restrictions are also possible and multiple restrictions may be used at the same time. Independent restrictions may be maintained for each type of log, and only the data lines containing all the restrictions for that log will be displayed in the window for that log.

The user may choose to display the TMM data graphically. When the graphical display option is selected, the screen displays voltage and current band changes chronologically over time. A maximum number of changes, for example, six, are displayed on one screen, and the time of each change is shown on the horizontal axis to the nearest significant decimal value, for example, one-hundredth of a second. The arrow keys on the keyboard 6 allow scrolling to displays of earlier or later changes. Voltage and current changes are displayed simultaneously with their scales on the vertical axis. Scales include positive and negative values. The DSM 3 also can produce printed copies of the TMM log, the SMDR log, or the graphical display screens on the printer 8.

The DCA 1 does not distinguish between dropped calls and normally terminated calls. One advantage of having both the SMDR data and the TMM data available for display simultaneously is that it facilitates the finding of the TMM data that corresponds to a dropped call. For example, a customer can provide information regarding the time of termination of a dropped call, the telephone number of the other party, and whether the call was incoming or outgoing. This information can be used to identify the SMDR records that correspond to the dropped call or calls. In addition, if SMDR records are available to the customer, they can be marked by the customer to identify the dropped calls. The customer's notes and the SMDR records can, in turn, be used to identify the corresponding TMM data. Once the TMM data corresponding to a dropped call is identified, the cause of the dropped call can be isolated to either the customer premises equipment or the central office equipment by analyzing the TMM data as explained above. Furthermore, the DCA 1 facilitates the identification of significant trends, such as whether calls identified as dropped occur predominantly on the central office equipment or the CPE, and whether dropped calls tend to appear on specific facilities or trunks.

The present invention has been described with respect to particular embodiments, It is to be understood, however, that variations within the scope of the invention will be readily apparent to persons of ordinary skill in the art. The present invention is, therefore, limited only by the scope of the appended claims.

We claim:

1. A diagnostic device comprising:
 a detector circuit having:
  (a) a pair of leads; and
  (b) a plurality of outputs which, when said pair of leads is connected electrically with a telecommunication trunk, provide a first set of output signals which correspond to current levels on said telecommunication trunk and a second set of output signals which correspond to voltage levels on said telecommunication trunk;
 a comparator circuit connected to said detector circuit so as to receive said first set of output signals and said second set of output signals, where said comparator circuit is capable of comparing said first set of output signals to pre-selected bands of current and comparing said second set of output signals to pre-selected bands of voltage; and
 a processing unit electrically connected to said comparator circuit and programmed to perform the following functions:
  (a) determine within which of said pre-selected bands each of said output signals falls;
  (b) determine the occurrence of a change in the preselected band within which an output signal on a particular one of said plurality of outputs falls, where said change occurs relative to an immediately previous scan of the particular one of said plurality of outputs;
  (c) record the time at which said change occurred;
  (d) provide at least one message indicating that said change occurred and indicating the present preselected band within which the particular output signal falls;
  (e) record the time at which a telecommunication call on said telecommunication trunk is terminated; and
  (f) provide at least one message including electrical data indicative of which equipment terminated said telecommunication call.

2. The diagnostic device of claim 1 further including a diagnostic software module connected to said processing unit so as to receive (a) said at least one message indicating that said change occurred and indicating the present pre-selected band within which the particular output signal falls and (b) said at least one message including electrical data indicative of which equipment terminated said telecommunication call, where said diagnostic software module provides a chronological display, in response to a user's request, of (a) said at least one message indicating that said change occurred and indicating the present pre-selected band within which the particular output signal falls and (b) said at least one message including electrical data indicative of which equipment terminated said telecommunication call.

3. The diagnostic device of claim 2 wherein said diagnostic software module is programmed to interpret said electrical data and to provide a message indicating which equipment terminated said telecommunication call.

4. The diagnostic device of claim 1 wherein the processing unit is further programmed to recognize the termination of said telecommunication call based upon a cessation of loop current flow on said telecommunication trunk.

5. The diagnostic device of claim 4 wherein the processing unit is further programmed to recognize the termination of said telecommunication call based upon a cessation of loop current flow on said telecommunication trunk for a duration greater than a pre-determined time interval.

6. The diagnostic device of claim 5 wherein said first set of output signals and said second set of output signals are voltage signals.

7. The diagnostic device of claim 6 wherein said plurality of outputs include an output which, when said pair of leads is connected electrically in series with said telecommunication trunk, provides a voltage level that corresponds to a tip-to-ring voltage on said telecommunication trunk.

8. The diagnostic device of claim 7 wherein said comparator circuit comprises a plurality of comparators such that there is one comparator for each pre-selected band of current and one comparator for each pre-selected band of voltage.

9. The diagnostic device of claim 8 wherein said detector circuit further includes a precision resistor such that the operation of said diagnostic device remains transparent to a customer's usage of equipment being monitored by said diagnostic device.

10. The diagnostic device of claim 9 further comprising:
 a plurality of detector circuits, each detector circuit having:
  (a) a pair of leads; and
  (b) a plurality of outputs which, when said pair of leads is connected electrically with a telecommunication trunk, provide a first set of output signals which correspond to current levels on said telecommunication trunk and a second set of output signals which correspond to voltage levels on said telecommunication trunk;
 wherein the plurality of outputs of each detector circuit are connected to said comparator circuit via at least one switch; and
 wherein the processing unit is connected to each said switch and is further programmed to select each detector circuit so as to permit the plurality of output signals from each detector circuit to be selectively received by said comparator circuit.

11. The diagnostic device of claim 10 further including a diagnostic software module connected to said processing unit so as to receive (a) said at least one message indicating that said change occurred and indicating the present pre-selected band within which the particular output signal falls and (b) said at least one message including electrical data indicative of which equipment terminated said telecommunication call, where said diagnostic software module provides a chronological display, in response to a user's request, of (a) said at least one message indicating that said change occurred and indicating the present pre-selected band within which the particular output signal falls and (b) said at least one message including electrical data indicative of which equipment terminated and said telecommunication call.

12. The diagnostic device of claim 11 wherein said diagnostic software module is programmed to interpret said electrical data and to provide a message indicating which equipment terminated said telecommunication call.

13. The diagnostic device of claim 12 wherein said diagnostic software module provides a display in response to a user's request of Station Message Detail Recording data corresponding to (a) said at least one message indicating that said change occurred and indicating the present pre-selected band within which the particular output signal falls and (b) said at least one message including electrical data indicative of which equipment terminated said telecommunication call.

14. A diagnostic device comprising:
   a detector circuit having:
      (a) a pair of leads; and
      (b) a plurality of outputs which, when said pair of leads is connected electrically with a telecommunication trunk, provide a first set of output signals which correspond to current levels on said telecommunication trunk and a second set of output signals which correspond to voltage levels on said telecommunication trunk;
   a comparator circuit connected to said detector circuit so as to receive said first set of output signals and said second set of output signals, and where said comparator circuit is capable of comparing said first set of output signals to preselected bands of current and comparing said second set of output signals to pre-selected bands of voltage;
   means for determining within which pre-selected band each of said output signals falls;
   means for determining the occurrence of a change in the preselected band within which an output signal on a particular one of said plurality of outputs falls, where said change occurs relative to an immediately previous scan of the particular one of said plurality of outputs;
   means for recording the time at which said change occurred;
   means for providing at least one message indicating that said change occurred and indicating the present pre-selected band within which the particular output signal falls;
   means for recording the time at which a telecommunication call on said telecommunication trunk is terminated; and
   means for providing at least one message including electrical data indicative of which equipment terminated said telecommunication call.

15. The diagnostic device of claim 14 further including means for providing a chronological display, in response to a user's request, of (a) said at least one message indicating that said change occurred and indicating the present pre-selected band within which the particular output signal falls and (b) said at least one message including electrical data indicative of which equipment terminated said telecommunication call.

16. The diagnostic device of claim 15 further including:
   means for interpreting said electrical data; and
   means for providing a message indicating which equipment terminated said telecommunication call in response to a user's request.

17. A diagnostic device for use in isolating the cause of dropped telecommunication calls, said diagnostic device comprising:
   means for monitoring electrical signals on a telecommunication trunk;
   means for providing a first set of output signals which correspond to current levels on said telecommunication trunk;
   means for providing a second set of output signals which correspond to voltage levels on said telecommunication trunk;
   means for comparing said first set of output signals to preselected bands of current;
   means for comparing said second set of output signals to pre-selected bands of voltage;
   means for determining within which pre-selected band each of said output signals falls;
   means for determining the occurrence of a change in the preselected band within which an output signal on a particular one of said outputs falls, where said change occurs relative to an immediately previous scan of the particular one of said plurality of outputs;
   means for recording the time at which said change occurred;
   means for recognizing an occurrence of a terminated telecommunication call on said telecommunication trunk;
   means for recording the time at which said telecommunication call is terminated;
   means for providing a message indicating that said change occurred and indicating the present pre-selected band within which the particular output signal falls; and
   means for providing a message indicating whether telephone network equipment or customer premises equipment terminated said telecommunication call.

18. The diagnostic device of claim 17 further including means for providing a chronological display, in response to a user's request, of (a) said message indicating that said change occurred and indicating the present pre-selected band within which the particular output signal falls and (b) said message indicating whether telephone network equipment or customer premises equipment terminated said telecommunication call.

* * * * *